United States Patent
Choi et al.

(10) Patent No.: US 6,989,878 B2
(45) Date of Patent: Jan. 24, 2006

(54) HIGH BRIGHTNESS TWISTED NEMATIC TRANSFLECTIVE LIQUID CRYSTAL DISPLAY

(75) Inventors: Wing Kit Choi, Orlando, FL (US); Shin-Tson Wu, Oviedo, FL (US)

(73) Assignees: University of Central Florida Research Foundation, Inc., Orlando, FL (US); Toppoly Optoelectronics Corp., (TW)

(*) Notice: Subject to any disclaimer, the term of this patent is extended or adjusted under 35 U.S.C. 154(b) by 0 days.

(21) Appl. No.: 10/430,589

(22) Filed: May 6, 2003

(65) Prior Publication Data

US 2003/0206257 A1    Nov. 6, 2003

Related U.S. Application Data

(60) Provisional application No. 60/378,317, filed on May 6, 2002.

(51) Int. Cl.
*G02F 1/1335* (2006.01)

(52) U.S. Cl. ..................................... 349/114; 349/107
(58) Field of Classification Search ............... 349/107, 349/114

See application file for complete search history.

(56) References Cited

U.S. PATENT DOCUMENTS

| | | | |
|---|---|---|---|
| 6,281,952 B1 * | 8/2001 | Okamoto et al. | 349/12 |
| 6,295,109 B1 * | 9/2001 | Kubo et al. | 349/119 |
| 6,327,016 B1 | 12/2001 | Yamada et al. | 349/160 |
| 2001/0019385 A1 | 9/2001 | Song et al. | 349/113 |
| 2001/0022634 A1 | 9/2001 | Chung et al. | 349/43 |

* cited by examiner

*Primary Examiner*—Andrew Schechter

(74) *Attorney, Agent, or Firm*—Brian S. Steinberger; Law Offices of Brian S. Steinberger, P.A.

(57) ABSTRACT

Transflective twisted nematic (TN) liquid crystal displays (LCDs) having enhanced transmission efficiencies. Due to the use of circularly polarized light, the novel TN transflective LCD uses a new operation mode between the conventional First and Second Minimums, which alters the retardation value of the reflection and the transmission portions, where the retardation values each include a cell gap spacing. This results in the cell gap spacing in the transmission portion of the transflective LCD to be approximately triple the cell gap spacing in the reflection portion of the transflective LCD whereby the transmission efficiency increases to approximately 90 percent.

7 Claims, 3 Drawing Sheets

HIGH BRIGHTNESS TWISTED NEMATIC TRANSFLECTIVE LIQUID CRYSTAL DISPLAY

This invention relates to transflective-type liquid crystal displays and in particular to methods and apparatus for improving the transmission of a transflective twisted-nematic (TN) mode liquid crystal display (LCD) from approximately 30 to approximately 90 percent by employing a new and higher mode of operation, and this invention claims the priority based on U.S. Provisional Application No. 60/378,317 filed May 6, 2002.

BACKGROUND AND PRIOR ART

Conventional transmission-type liquid crystal displays (LCDs) exhibit high contrast ratio with good color saturation. However, their power consumption is high due to the need of a backlight. At bright ambient, the display is washed out completely and hence loses its legibility. On the other hand, a reflective LCD uses ambient light for reading out the displayed images and hence retains its legibility under bright ambient. Their power consumption is reduced dramatically due to the lack of a backlight. However, the readability of a reflective LCD is lost under poor ambient light. In addition, its contrast ratio is also lower than that of the transmission-type LCD.

In order to overcome the above inadequacies, transflective LCDs have been developed to allow good legibility under any ambient light environment. In these displays the pixel is divided into R (reflective) and T (transmissive) sub-pixels. The T sub-pixel doesn't have reflector so that it allows light from backlight to pass through and the device can operate in the transmission mode. Usually, the R and T area ratio is 4:1, in favor of reflective display. The transmission mode is used for dark ambient only in order to conserve power. In general, there are two main approaches for transflective LCDs: single cell gap (see FIG. 1a hereafter) and double cell gap (see FIG. 1b hereafter).

In the single cell gap approach, the cell gap (d) for R and T modes is the same. The cell gap is optimized for R-mode. As a result, the light transmittance for the T mode is generally 50% or lower because the light only passes the LC layer once. In order to achieve high light efficiency for both R and T, the double cell gap approach (e.g. see US published Application 2001/0019385 to Song et al.) can be often used such that the cell gap for the T pixels is twice as large as that for R pixels as shown in FIG. 1b. In this case the total length traveled by light in the LC layer is the same for both T and R. This approach however is suitable only for the ECB (Electrically Controlled Birefringence) mode, e.g. the Vertical Alignment (VA) and the Parallel Alignment (PA) modes.

A commonly used and well-established LC mode for transmissive TFT-LCDs is the well-known TN (Twisted-Nematic) mode. It has been used for the transmissive displays since the 1970's. For the reflective LCDs, the commonly used MTN (Mixed-mode Twisted Nematic) mode nowadays is also based on the TN structure. The major advantages of these TN-based modes compared with the PA and VA modes include high contrast ratio (low dispersion) without the use of compensation films, higher cell-gap tolerance, easier fabrication (due to higher cell gap) and wide viewing angle. It is therefore highly desirable to be able to keep these TN-based LC modes for the transflective LCDs as they are compatible with the existing TFT-LCD fabrication process as well as having many attractive advantages over other LC modes.

Patent No. WO 0017707 to Sharp describes a transflective LCD based on the TN mode using the single cell gap approach. However, the maximum transmission of T is only about 30%. Due to the twist that exists in the TN LC, the retardation effect is much more complicated compared with the ECB mode. Doubling the cell gap of T in this case doesn't help to increase the efficiency. In fact, doubling the cell gap of T, which corresponds to the conventional TN First Minimum condition, leads to zero transmission since the polarization rotation effect of TN then dominates which doesn't have significant effect on the circularly polarized light. Therefore, it is not straight forward to use the TN effect for transflective LCD due to the use of circularly polarized light. Circularly polarized light is needed since quarter-wave retarders are placed in front of polarizers to make the device Normally-White mode which has higher contrast. The performance of the existing TN transflective LCD technology thus suffers from the limitation of very low transmissions.

A recent search in the United States Patent Office directed to the subject matter of the invention hereafter disclosed developed only the following additional U.S. Patent and U.S. Patent publication:

U.S. Pat. No. 6,327,016 B1 to Yamada, et al is about a method of improving the performance of a conventional ASM mode LCD device by providing axially symmetrical ASM alignment for the transmissive LCDs; and, U.S. Patent Publication 2001/0022634 A1 to Chung, et al discloses a technique for improving the fabrication process of a single cell-gap transflective LCD device rather than improving optical performance of transflective LCD through modification of the LC electro-optic effect.

Thus, all the known literature provides no performance from the existing TN transflective LCD technology that reduces its limitation of very low transmissions.

SUMMARY OF THE INVENTION

A primary objective of the invention is to provide an improved twisted nematic (TN) mode transflective liquid crystal display(LCD) that increases transmission of the TN transflective LCD from approximately 30 percent to approximately 90 percent over single cell gap LCDs through a new and higher mode of operation.

A second objective of the invention is to provide an improved transflective twisted nematic (TN) mode liquid crystal display(LCD) that increases transmission of the TN transflective LCD to higher levels by using an unconventional twisted nematic (TN) mode that occurs between the conventional First and Second minimum conditions. These conventional First or second Minimum conditions lead to zero transmission and cannot be used for Transflective LCDs addressed by circularly polarized light.

A third objective of the invention is to provide an improved twisted nematic(TN) mode transflective LCD that requires cell gap ratio between reflective(R) and transmissive(T) sub-pixels of approximately 3 to 1, which is different from the conventional 2 to 1 for the ECB-based modes.

A preferred embodiment of the invention includes a method and apparatus for improving transmission and reflection in twisted nematic(TN) transflective liquid crystal displays(LCDs) that increases efficiency of the transmission portion of the LCD to substantially greater than 30 percent, and up to approximately 90 percent efficiency.

Further objects and advantages of this invention will be apparent from the following detailed description of a presently preferred embodiment, which is illustrated schematically in the accompanying drawings.

BRIEF DESCRIPTION OF THE FIGURES

FIG. 4b is a plot of transmission and reflection vs. voltage for the TN transflective LCD using single-cell-gap structure of Prior Art in FIG. 1a.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject invention demonstrates that transmission T of a TN transflective LCD can be boosted to a much higher level by using a new and higher order operation mode which has approximately triple cell gap of the R's. This increased efficiency can be achieved by employing a new operation mode which occurs between the conventional First and Second Minimum conditions. This requires the increase of cell gap in the transmission portion of the LCD to more than double the spacing gap in the reflection portion of the LCD. For example, having the cell gap spacing in the reflection portion be approximately 2.5 μm, and the cell gap spacing in the transmission portion is approximately 8 μm increases transmission efficiency to approximately 90 percent.

It is important to note that the actual cell gap value depends on the birefringence value since retardation value is equal to cell gap multiplied by birefringence value as defined below. Birefringence and cell gap values are dependent upon one another such that their product defines the retardation value. Retardation values can be fixed for a given twist angle as defined below where:

Limits of twist angle: approximately 80 to approximately 100 degrees.

Limits of retardation value in reflection portion: approximately 200 to approximately 300 nm.

Limits of transmission value in the transmission portion: approximately 700 to approximately 900 nm.

Figure 1A:
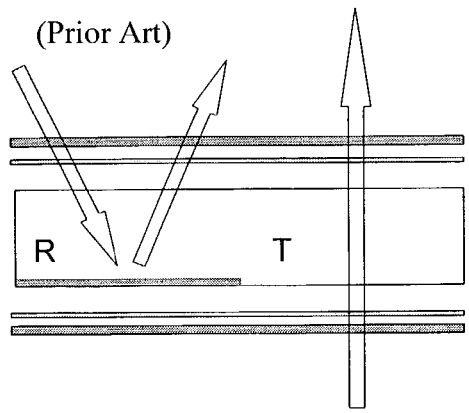
FIG. 1a is a view of a prior art transflective liquid crystal display(LCD) with a single cell gap.
Figure 1B:
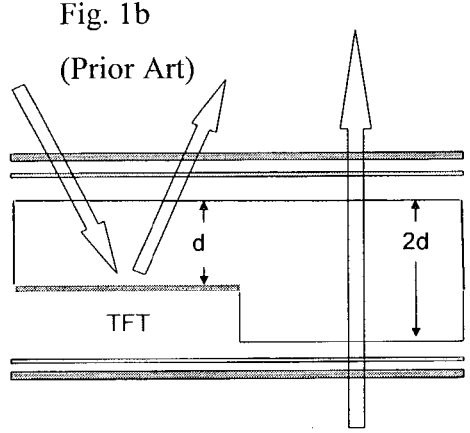
FIG. 1b is a view of a prior art transflective LCD with a double cell gap.
Figure 2:
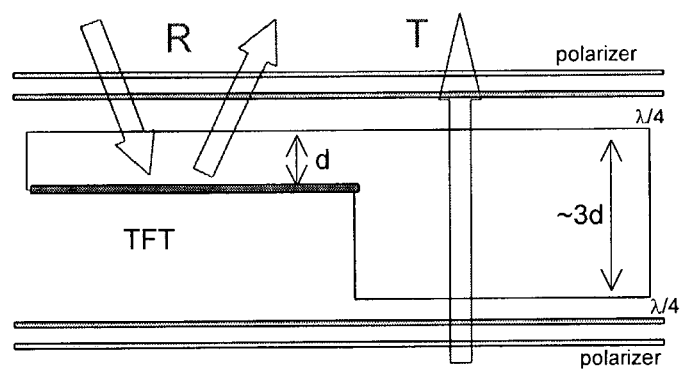
FIG. 2 shows a twisted nematic(TN) mode transflective LCD using a novel triple cell gap according to the invention.

Reference should now be made to FIG. 2, which illustrates the basic structure of this approach. Cell gap of the T sub-pixel (=approximately 3d) 22 is approximately three times of that of the R sub-pixel (=d) 24, which is unique for TN due to the effect of the twist angle. In FIG. 2, the thin film transistor 26, as is the two (upper 27 and lower 28) polarizers.

Figure 3A:
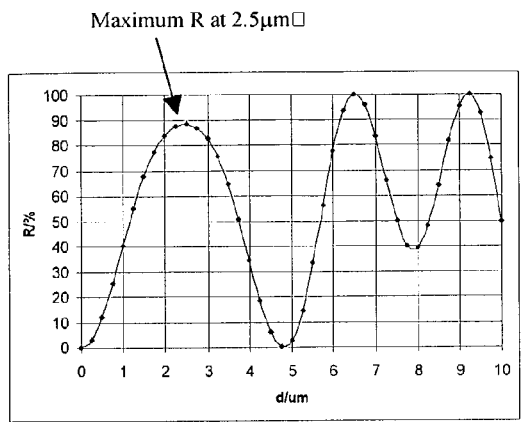
FIG. 3a is a plot of reflection vs. cell gap for the transflective LCD of FIG. 2.
Figure 3B:
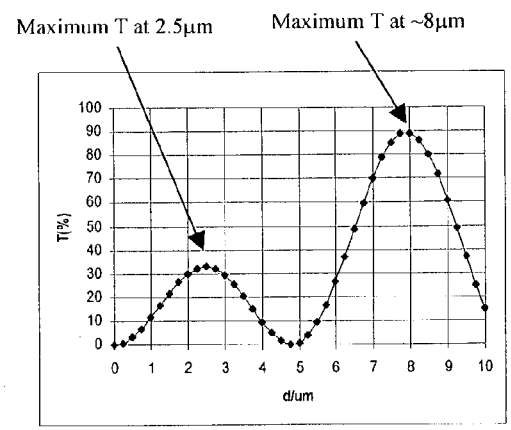
FIG. 3b is a plot of transmission vs. cell gap for the transflective LCD of FIG. 2.

FIGS. 3a and 3b show the cell-gap dependence of R and T respectively for a twisted nematic (TN) transflective LCD using this approach. The simulation results are based on a LC with birefringence $\Delta n$=approximately 0.1 and TN twist angle of approximately 90°. Birefringence values lower or higher than approximately 0.1 can also be used. The retardation value, which is equal to the product of birefringence and cell gap($\Delta n \times d$), should remain more or less constant for a given twist angle in order to maintain the desired optical performance. The twist angle is also not limited to approximately 90°. However, twist angles around approximately 90° are able to provide the highest contrast ratios.

Figure 4A:
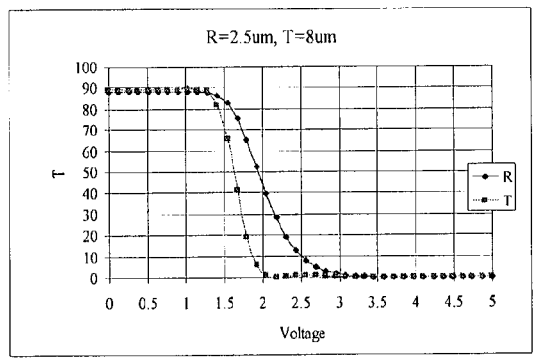
FIG. 4a is a plot of transmission and reflection vs voltage for the LCD of FIG. 2

As can be seen from FIGS. 3a and 3b, both R and T have a maximum occurring at approximately 2.5 μm (i.e. retardation $\Delta n d$ =approximately 250 nm since $\Delta n$=approximately 0.1). For the reflective mode this corresponds to the MTN mode. The light efficiency is high for R (approximately 90%) but very low for T (approximately 30%). Doubling the cell gap of T to approximately 5 μm leads to zero transmission as shown to FIG. 3b which is due to domination of the polarization-rotation-effect as previously described. However, the transmission that occurs at approximately 8 μm in FIG. 3b has efficiency of approximately 90%, which is significantly higher than that of approximately 30% at approximately 2.51μm. The cell gap of T (approximately 8 μm) is approximately three times of that of R (approximately 2.5 μm). FIG. 4a shows the voltage dependence of R and T of this TN transflective LCD using this approach.

Figure 4B:
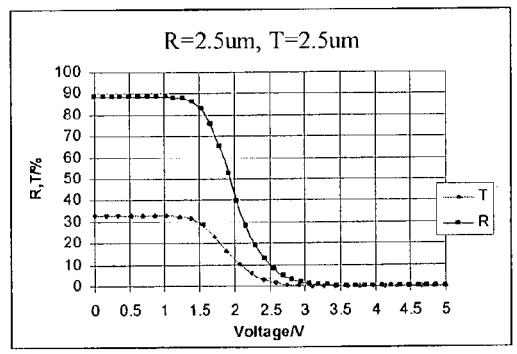

Referring again to FIG. 4a both T and R have high efficiencies of approximately 90%. As a comparison, FIG. 4b shows the corresponding plots using the referenced Sharp patent's single cell gap approach such as U.S. Pat. No. 6,281,952 B1, in this case T is limited to approximately 30%. Therefore, it is clear that the new operation mode will improve the performance of the potential TN transflective LCDs.

Figure 5:
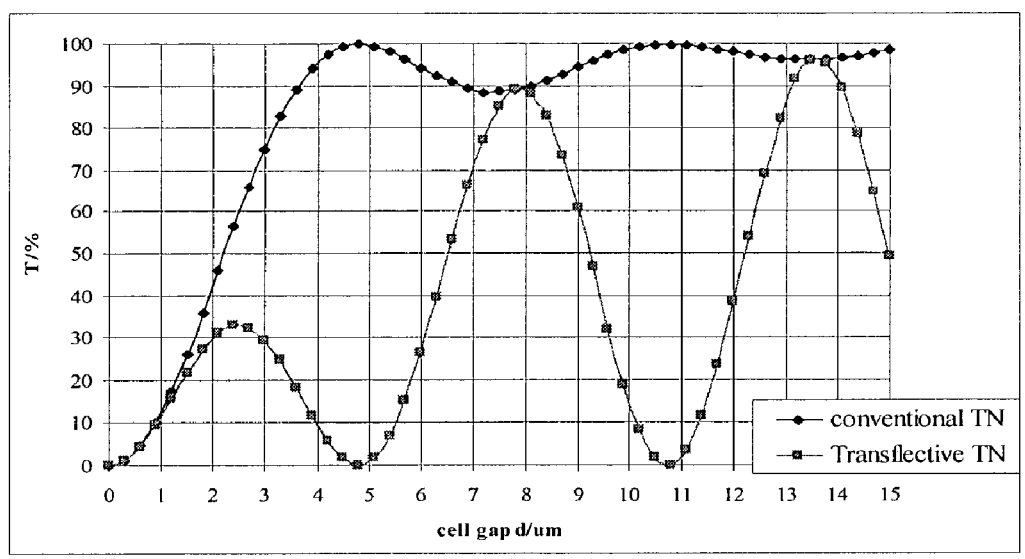
FIG. 5 shows the comparison of the cell-gap dependence of a TN transflective LCD and a conventional TN LCD (i.e. transmission-type TN LCD without quarter-wave retarders).

Another novel feature of this approach is that this TN mode is an unconventional mode that occurs between the commonly used TN modes. FIG. 5 illustrates this principle by comparing the cell-gap dependence of a TN transflective LCD and a conventional TN LCD (i.e. transmission-type TN LCD without quarter-wave retarders). The conventional TN LCD shows maximums at approximately 5 μm and approximately 11 μm (corresponding to the Gooch & Tarry's First and Second minimums). Normally, either one of these two modes is used for the optimum operation condition of a conventional TN LCD since they give maximum brightness. However, as illustrated in the same figure, these two cell-gap conditions lead to, instead of maximum, minimum brightness for a transflective LCD. Thus, they cannot be used directly for a TN transflective LCD. However, the valley that occurs between the two maximums of a conventional TN actually corresponds to a maximum for a TN transflective LCD. This mode isn't normally used for the conventional TN since its transmission is lower than the two adjacent maximums. It however becomes advantageous for transflective since it helps to boost the transmission to a much higher level.

The invention improves the transmission of a TN transflective LCD from approximately 30% to approximately 90%. The low transmission of the referenced Sharp patent's transflective TN is a major weakness, which limits the potential use of TN mode for transflective devices. However, this invention has demonstrated that achieving a high performance TN transflective LCD can be accomplished according to the teachings of this invention.

Unlike the double cell gap approach which only allows VA (Vertical alignment) and PA (Parallel Alignment) LC modes which are less commonly employed technologies for TFT-LCD industry, this invention can be based upon the common TN (Twisted-Nematic) mode which is a widely used mode for the existing transmissive as well as reflective TFT-LCDs. Therefore this invention can make the fabrication technology of the transflective LCD more compatible with the existing technologies.

The invention can have applications for hand-held and mobile communications such as but not limited to mobile telephones, personal digital assistants(PDA), e-books, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of improving transmission and reflection in twisted nematic(TN) liquid crystal displays(LCDs) addressed with circularly polarized light, comprising the steps of:
   (a) providing a twisted nematic(TN) liquid crystal display (LCD) with a twist angle of approximately 90 degrees having a transmission portion retardation value and reflection portion retardation value, the twisted nematic (TN) liquid crystal display(LCD) having a liquid crystal layer; and
   (b) having a higher transmission portion retardation value to use a different operation mode which occurs when the higher retardation value is between First and Second Minimums of the Gooch & Tarry curve, whereby the transmission efficiency is substantially improved in the twisted nematic(TN) liquid crystal display.

2. The method of claim 1, wherein said having a higher transmission portion retardation value comprises having approximately triple the retardation value of the reflection portion in the LCD.

3. The method of claim 1, wherein the retardation value in the reflective portion is approximately 250 nm, the retardation value of transmission portion is approximately 800 nm, thereby improving the transmission efficiency of the liquid crystal layer to approximately 90 percent.

4. A twisted nematic(TN) liquid crystal display(LCD) with a liquid crystal layer having improved transmission and reflection, comprising:
   (a) a transmission portion in the TN LCD having a first retardation value;
   (b) a reflection portion in the TN LCD having a second retardation value different from the first retardation value in the transmission portion, and
   (c) means for increasing transmission efficiency of the transmission portion in the twisted nematic liquid crystal display to be substantially greater than approximately 30 percent.

5. The twisted nematic(TN) liquid crystal display(LCD) of claim 4, wherein the means for increasing transmission efficiency is to make the retardation value in the transmission portion of the LCD substantially greater than double the retardation value in the reflection portion of the LCD.

6. The twisted nematic(TN) liquid crystal display(LCD) of claim 4, wherein the retardation value in the transmission portion is approximately triple the retardation value of the reflection portion of the LCD, whereby the transmission efficiency of the liquid crystal layer is approximately 90 percent.

7. The twisted nematic(TN) liquid crystal display(LCD) of claim 4, wherein the retardation value in the reflection portion is approximately 250 nm, and the retardation value in the transmission portion is approximately 800 nm.

* * * * *